United States Patent [19]

Mishima et al.

[11] Patent Number: 4,907,094

[45] Date of Patent: Mar. 6, 1990

[54] DATA COMMUNICATION SYSTEM

[75] Inventors: Kenichi Mishima, Yokohama; Katsuhito Takezawa, Tokyo, both of Japan

[73] Assignee: Canon Kabushiki Kaisha, Tokyo, Japan

[21] Appl. No.: 147,224

[22] Filed: Jan. 22, 1988

[30] Foreign Application Priority Data

| Jan. 28, 1987 | [JP] | Japan | 62-17853 |
| Jan. 28, 1987 | [JP] | Japan | 62-17854 |
| Jan. 28, 1987 | [JP] | Japan | 62-17855 |
| Jan. 29, 1987 | [JP] | Japan | 62-19248 |

[51] Int. Cl.⁴ .............................................. H04N 1/32
[52] U.S. Cl. ..................................... 358/437; 358/404; 358/436
[58] Field of Search ................ 358/256, 257, 280, 296, 358/400, 436, 404, 437, 434, 443, 444; 370/94; 379/93; 340/825.5

[56] References Cited

U.S. PATENT DOCUMENTS

| 4,598,323 | 7/1986 | Honjo et al. | 358/285 |
| 4,622,594 | 11/1986 | Honjo et al. | 358/293 |
| 4,652,873 | 3/1987 | Dolsen et al. | 340/825.5 |
| 4,677,649 | 6/1987 | Kunishi et al. | 375/122 |
| 4,679,093 | 7/1987 | Yaguchi | 358/257 |
| 4,682,186 | 7/1987 | Sasaki et al. | 346/140 R |
| 4,704,636 | 11/1987 | Yano | 358/434 |
| 4,706,126 | 11/1987 | Kondo | 358/256 |
| 4,706,127 | 11/1987 | Nobuta | 358/280 |
| 4,712,139 | 12/1987 | Kato | 358/257 |
| 4,717,967 | 1/1988 | Yoshida | 358/296 |
| 4,727,435 | 2/1988 | Otani et al. | 358/256 |
| 4,736,249 | 4/1988 | Iizuka et al. | 358/257 |
| 4,743,975 | 5/1988 | Ijuin | 358/288 |
| 4,759,053 | 7/1988 | Satomi et al. | 358/257 |
| 4,789,900 | 12/1988 | Takahashi | 358/257 |
| 4,805,135 | 2/1989 | Ochi et al. | 364/900 |

FOREIGN PATENT DOCUMENTS 0001373 1/1983 Japan.

OTHER PUBLICATIONS

Elektronische Text Kommunikation, Springer-Verlag, 1978, pp. 216-224 and 227-235.

Primary Examiner—James J. Groody
Assistant Examiner—Kim Vu
Attorney, Agent, or Firm—Fitzpatrick, Cella, Harper & Scinto

[57] ABSTRACT

A communication system for communicating a document comprising image data, character code data, and the like has: a receiver to receive the document data; a memory to store the received document data; a designating unit designate the data in the memory; an instructing unit to command the printing of the designated data; a printer to print the designated data on the basis of the instruction by the instructing unit; and a controller for allowing the received document data to be printed by the printer when a failure of the memory is detected even if printing is not commanded by the instructing unit. The failure of the memory may be a lack of memory capacity. The received document data may be output to either the memory or the printer in accordance with signals from the transmission side. This system includes another instructing unit to command the deletion of the designated document data from the memory. With this system, the document data sent from the transmission side can be certainly and promptly received by the reception side and can be printed out as necessary by command of the operator even if the auxiliary memory unit on the reception side is out of order.

10 Claims, 9 Drawing Sheets

DATA COMMUNICATION SYSTEM

BACKGROUND OF THE INVENTION

1. Field of the Invention

The present invention relates to a communication system for performing the communication of character code data, image data, or the like.

2. Related Background Art

In recent years, in the field of office automation, there has been put into practical use in the market an apparatus, i.e., mixed apparatus, such that image information (such as figures, graphics, photographs, or the like) is electronically processed, or character information to be processed by a word processor or the like and the image information are edited and processed as a document, and this document is communicated with another apparatus through a communication network or the like.

In such an apparatus, the image information is input from an input device such as an image scanner or the like, the character information is input from an input device such as a keyboard, and this information is stored in image memories or the and displayed by a display device such as a CRT and edited by use of an input device such as a pointing device, a keyboard, or the like. The character information in the document edited in this manner is transmitted by codes and the image information is compressed and thereafter transmitted to another apparatus through a communication unit.

The receiving apparatus which receives the document temporarily stores the received document in an auxiliary memory unit and informs the operator of the reception of the document by a message displayed by an LED, CRT, or the like. The operator looks at this message and activates the utility to output the received document.

The utility to output the received document stores the character information as bit patterns in an image memory by use of a character generator. On the other hand, the image information is expanded by use of a compression/expansion unit and thereafter stored in the image memory. After all of the document information of one page is stored, the information in the image memory is printed and output on a recording paper which is set in an output device such as a laser beam printer or the like.

In the foregoing apparatus, in order to edit the received document or to transmit the received document to another communication terminal, the received document is temporarily stored in a preservation storage unit and is printed and output only by an instruction of the operator.

Therefore, in the foregoing conventional apparatus, there is a problem such that even in the case of a document which must be promptly sent from the transmission side, it is stored and held on the reception side. On the other hand, there is also a possibility such that while a document is being stored, an abnormality occurs in the hardware, so that the document is deleted. Further, there is a problem such that when the rest of memory does not exist in the memory unit on the reception side, the reception is refused.

On the other hand, in such an apparatus, if there is no vacancy of the memory in the auxiliary memory unit on the reception side, the communication with the transmission side is forcedly interrupted. In this case, in order to enable the transmission side to know the state in which the communication can be restarted since a vacancy is formed in the auxiliary memory unit, the transmission side must monitor the reception side. On the other hand, there is a problem such that in order to enable the transmission side to promptly know the state in which the communication to the reception side can be restarted, the reception side must be always monitored.

On the other hand, the foregoing apparatus can select whether the received document stored in the memory is printed by a printer or displayed by a display device such as a CRT or the like on the basis of an instruction of the operator. In such an apparatus, if the memory such as a hard disc device or the like is out of order during the operation, not only the local operation such as copy, edition, or the like and the transmitting operation but also the receiving operation cannot be executed.

In this case, even if the local operation and the transmitting operation are executed after the failure of a memory such as a hard disc device or the like was repaired, a problem will hardly occur.

However, if information was transmitted from a distant apparatus when the memory such as a hard disc device or the like is out of order, it cannot be received at all, so that a problem occurs. In particular, this causes a serious problem if the transmitted document is important.

On the other hand, in the foregoing conventional apparatus, it is possible to delete only the received document which was printed by the printer or the received document which was output to the display device and which was temporarily stored and held in the memory such as a hard disc device or the like.

Therefore, when the operator is directly operating the apparatus, every occurrence of the reception of a document, or when a predetermined amount of a document has been stored in the hard disc device or the like, the operator instructs a printing. After completion of the printing, the printed received document is enabled to be deleted from the memory. With this constitution, the impossibility of reception due to the lack of memory can be avoided.

However, if the document was continuously received without being printed and the received document is stored and held in the hard disc device or the like, the impossibility of the reception due to the lack of memory such as a hard disc or the like occurs. In particular, there is a problem such that when the apparatus is set in the automatic receiving mode for 24 hours, if a large amount of documents were received in the unmanned operating mode at night or the like, the impossibility of reception due to the lack of memory in the hard disc or the like occurs.

As communication systems using a reception memory of a large memory capacity, the applicant of the present invention has so far proposed U.S. patent application Ser. No. 873,541, and U.S. Pat. Nos. 4,622,594, 4,598,323, 4,712,139, 4,679,903, 4,805,135, 4,706,127, 4,789,900, 4,682,186, 4,677,649, and 4,717,967, and the like.

However, the applicant of the present invention has not proposed so far a communication system which can solve the foregoing problems.

SUMMARY OF THE INVENTION

It is an object of the invention to provide a communication system which can eliminate the foregoing various kinds of drawbacks.

A specific object of the invention is to provide a communication system which can be easily used by the user and has a high reliability.

In more detail, according to one aspect of the invention, it is an object of the invention to provide a mixed terminal apparatus in which the document transmitted from the transmission side can be certainly and promptly output on the reception side.

According to another aspect of the invention, it is an object of the invention to provide a communication system in which after the communication is forcedly interrupted because there is no vacancy in memory in an auxiliary memory unit on the reception side, the communication can be promptly restarted when the communication with the reception side is enabled to be restarted.

According to still another aspect of the present invention, it is an object of the invention to provide a communication system having a memory for storing a received document, in which even if the memory is out of order, this document can be certainly received.

According to still another aspect of the invention, it is an object of the invention to provide a terminal apparatus which can avoid a reception impossible state which is caused due to the lack of memory for storing a received document.

The above and other objects and features of the present invention will become apparent from the following detailed description and the appended claims with reference to the accompanying drawings.

DETAILED DESCRIPTION OF THE PREFERRED EMBODIMENTS

Figure 1:
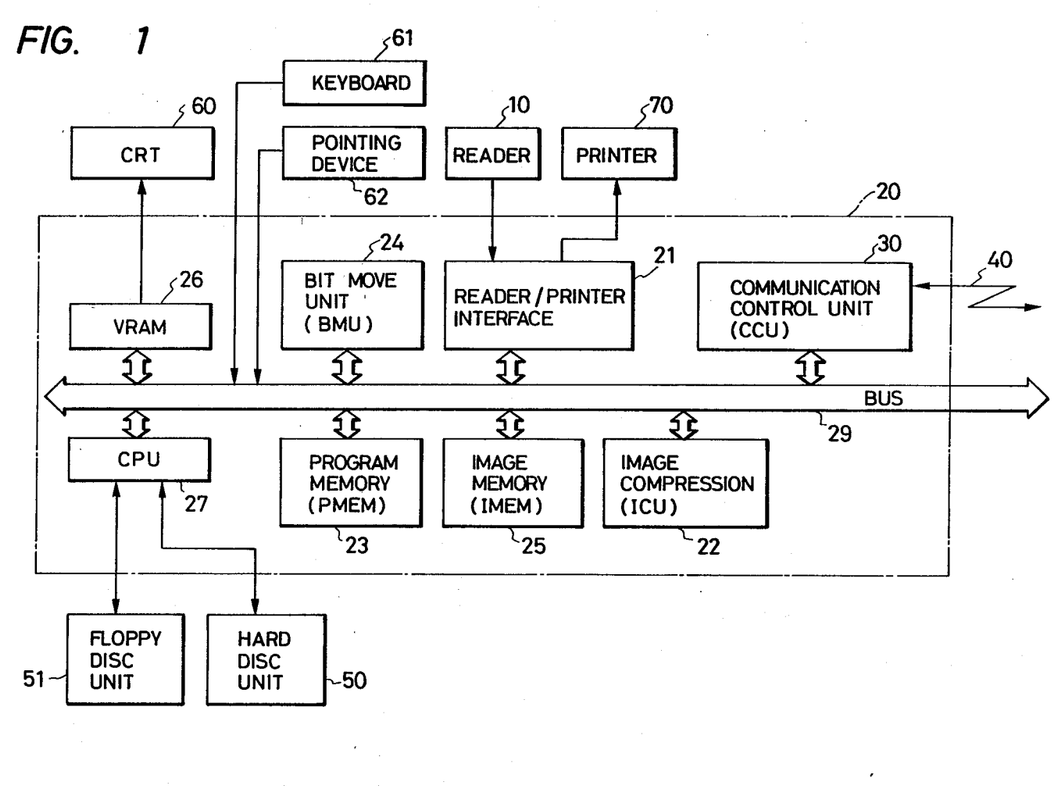
FIG. 1 is a block diagram showing an embodiment of the present invention.
Figure 2:
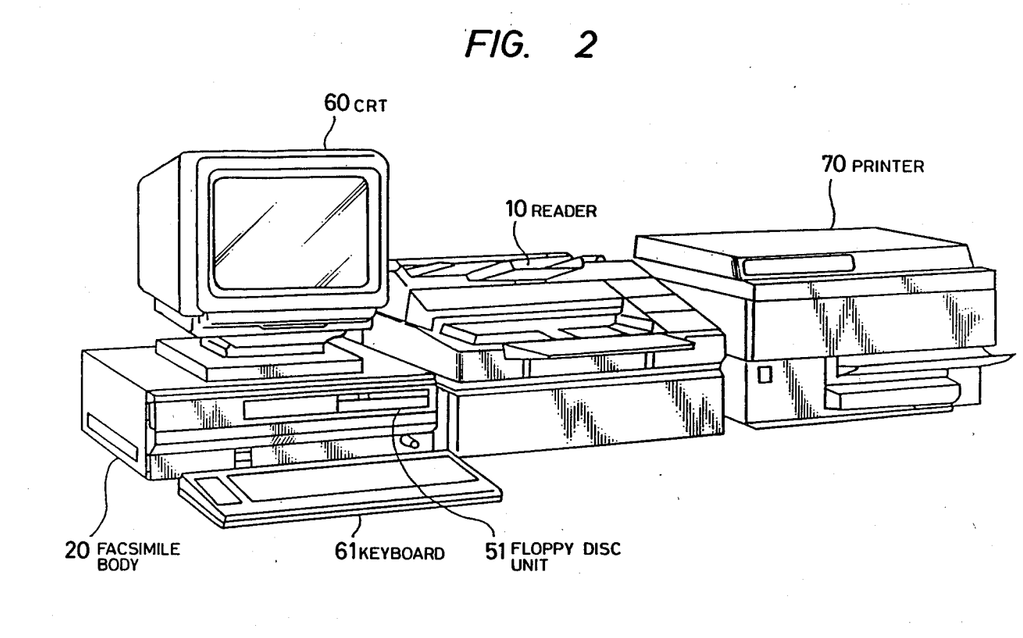
FIG. 2 is a perspective view of the FIG. 1 embodiment.

FIG. 1 is a block diagram showing the first embodiment of the present invention. FIG. 2 is a perspective view of the first embodiment.

This embodiment comprises: a reader 10 to read a predetermined original and output an electric signal; a facsimile body 20 to perform communication control, copy control, document edition control, and the like; a hard disc unit 50 as an external memory device; a floppy disc unit 51 as a temporary memory device; a CRT 60 for display; a keyboard 61 to input data for edition and character data; a pointing device 62 to designate coordinate positions; and a printer 70 to record a received document and a produced document. Numeral 40 denotes a communication line.

The facsimile body 20 comprises: a reader/printer interface 21; an ICU (image compression unit) 22; a PMEM (program memory) 23; a BMU (bit move unit) 24; an IMEM (image memory) 25; a VRAM (video RAM) 26; a CPU (central processing unit) 27; a bus 29; and a CCU (communication control unit) 30.

The ICU 22 compresses or expands data. To raise the encoding ratio, a two-dimensional compression (high compression) is used.

The PMEM 23 has a memory area for an operating system (OS) program to control input/output apparatuses provided around the facsimile body 20 and each unit in the facsimile body 20, a memory area for an application program, and a font memory area to convert a character structure into an image. The PMEM 23 also has a memory management unit (MMEM) and a work area as a buffer for transmission data to transmit the data from the hard disc unit 50 to the CCU 30 and to store the data from the CCU 30 to the hard disc. The PMEM 23 also stores code data of a document by the keyboard 61.

Further, the PMEM 23 stores a memory failure detecting program to detect a failure of a memory such as the hard disc unit 50 or the like to store a received document.

The BMU 24 edits an image on the CRT 60, namely, executes enlargement, reduction, rotation, movement, cut, or the like of a predetermined image.

The IMEM 25 has eight megabytes and stores an image from the reader 10 or stores the data obtained by converting codes into an image.

The image data which is displayed by the CRT 60 is stored as bit map codes in the VRAM 26.

In place of the hard disc unit 50 or floppy disc unit 51, another nonvolatile memory, e.g., a semiconductor memory which is backed up by a battery, may also be used. The keyboard 61 is used to input characters or designate a position on the CRT by use of a cursor. The printer 70 outputs a document produced by synthesizing the character codes which were input through the keyboard 61 and the image data which was read by the reader 10. The printer 70 is also used to output a document or the like transmitted through the CCU 30.

The PMEM 23 and CPU 27 are provided as an example of memory failure detecting means for detecting a failure of a memory to store the received document, and are also provided as an example of control means for allowing the received document to be printed by the printer 70 without storing the memory after the memory is out of order.

The operation of the embodiment will now be described. As a rule, the system in the embodiment temporarily stores the received document in the memory unit 50 or 51 and does not print out until the operator commands the printing. On the other hand, the received document stored in the memory is not deleted until the operator commands the deletion. Therefore, the operator can edit the received document, can transmit the edited document, or can directly delete the unnecessary document in the received document without printing while observing the received document displayed on the display unit.

First, the operation to detect a failure of the memory will now be described.

The memory failure detecting program is stored in the PMEM 23 and is executed by the CPU 27. If the hard disc unit 50 (as the memory unit to store the received document) is out of order, the memory failure detecting means is activated. At this time, the received document stored in the PMEM 23 is decoded by use of the ICU 22 or corrected using the BMU 24 and stored in the IMEM 25. The stored received document is printed by the printer 70. On the other hand, even when the rest of the memory is a predetermined amount or less, the received document can be printed out by the printer 70.

Figure 3A:
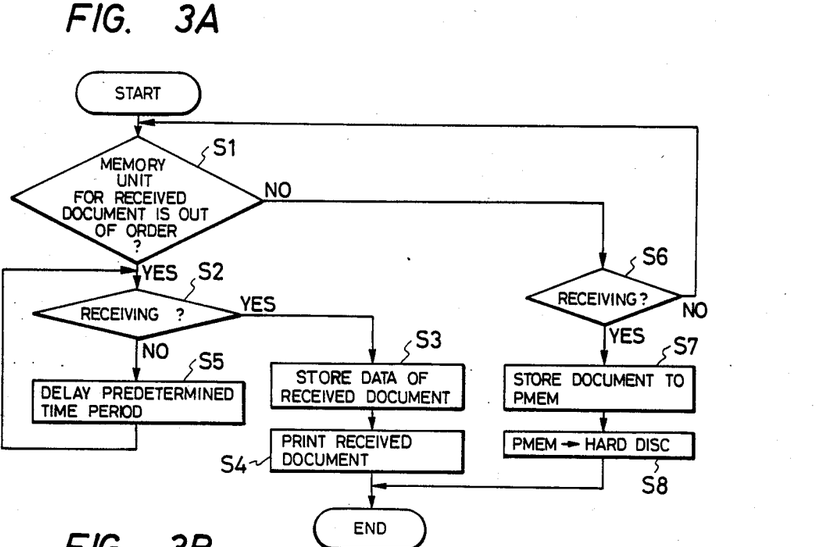
FIGS. 3A and 3B are flowcharts showing the operation to detect a failure of a memory in the FIG. 1 embodiment.

FIG. 3A is a flowchart showing the operation to detect a failure of the memory in the embodiment.

First, if the hard disc unit 50 to store the received document is out of order or the rest of the memory is a predetermined amount or less (S1), a check is made to see if a document is being received or not (S2). If YES, the document which is being received in the PMEM 23 is decoded by the ICU 22 or the data is corrected by the BMU 24, then the document is stored in the IMEM 25 (S3). The stored received document is printed by the printer 70 (S4).

On the other hand, even when the hard disc unit 50 is out of order, if the document is not received (S2), the memory failure detecting means checks the receiving operation at a constant period of time (every about one to two seconds) (S5). If a document has been received, the received document data is stored (S3) and printed (S4).

Figure 3B:
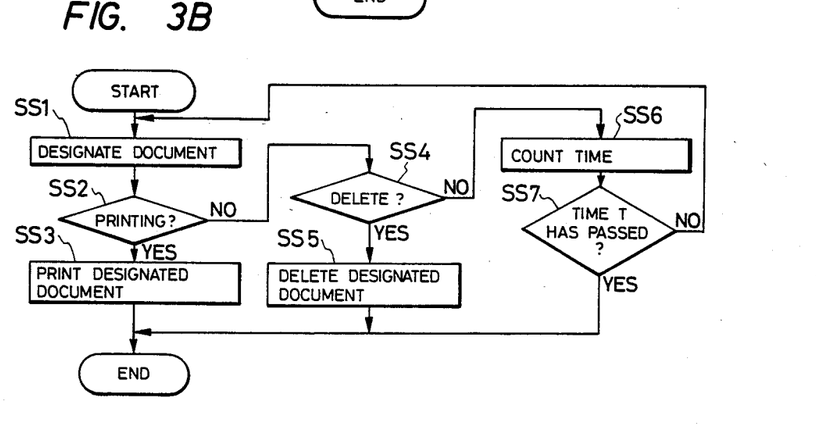

If the hard disc unit 50 is normal, the document received through the CCU 30 is temporarily stored in the PMEM 23 (S7) and stored into the hard disc unit 50 (S8). As necessary, the received document stored in the hard disc unit 50 is printed by the printer 70. The printing and deleting operations are shown in FIG. 3B. When the document has been designated by the keyboard (SS1), a check is made to see if printing is commanded or not (SS2) and a check is made to see if deletion is commanded or not (SS4). If printing has been commanded, the designated document is printed (SS3). If deletion has been commanded, the designated document is deleted (SS5). On the other hand, if no instruction is input even after the elapse of a predetermined period of time T after the document had been designated, the processing routine is finished.

The foregoing embodiment relates to the mixed terminal apparatus. However, the invention can be also applied to a data communication terminal apparatus to communicate only images, only character codes, or only numerical value data.

According to the embodiment, there is an effect such that in a terminal apparatus having a memory to store the received document, even if the memory is out of order, the document can be certainly received.

The PMEM (program memory) 23 also stores a remaining memory amount detecting program for detecting whether the the remaining memory capacities in the memory units 50 and 51 are a predetermined amount or less. On the other hand, the PMEM 23 and CPU 27 are provided as an example of control means for allowing the received documents stored in the memory units 50 and 51 to be printed by the printer 70, and for allowing the printed received documents to be deleted from the memory units 50 and 51 when the remaining memory capacities in the memory units 50 and 51 are predetermined amounts or less.

The operation in the embodiment will now be explained.

Figure 4:
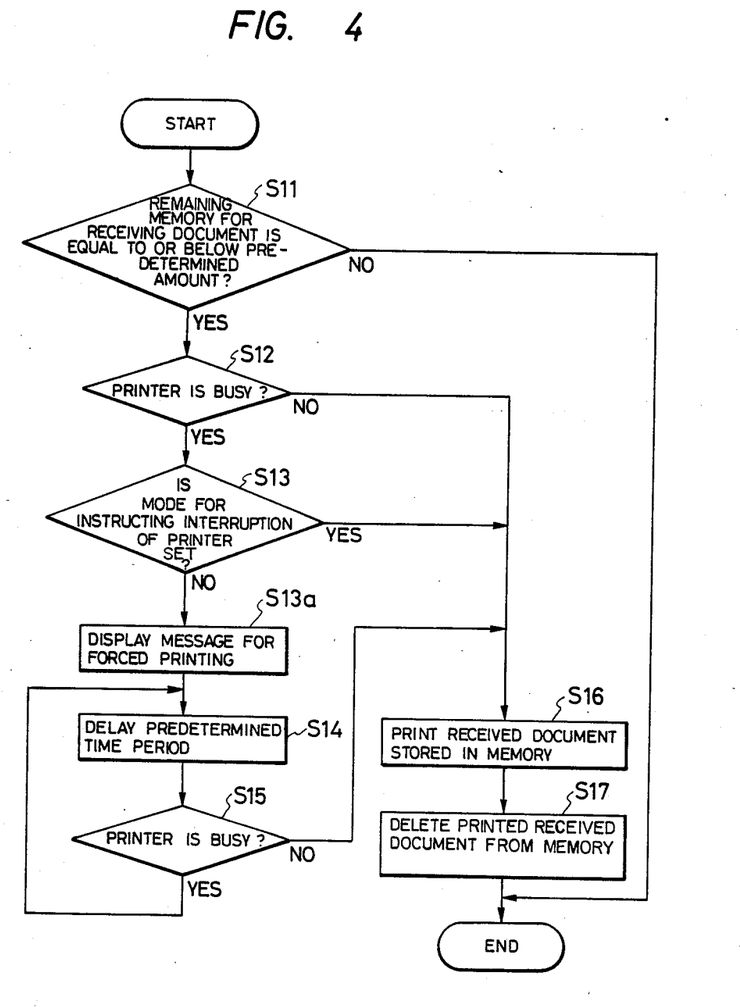
FIG. 4 is a flowchart showing the operation to avoid the reception impossible state due to the lack of memory in the FIG. 1 embodiment.

FIG. 4 is a flowchart showing the operation in the embodiment.

The program to detect the remaining memory is stored in the PMEM 23 and executed by the CPU 27. The remaining memory amount detecting operation is activated at a constant period, thereby checking the rests of the memories in the hard disc unit 50 and floppy disc unit 51 in which the received document is stored (S11).

If the remaining memory is a predetermined amount (which can be previously designated by the operator) or less and the printer 70 is not busy (S12), the received document stored in the memory is immediately printed (S16). The received document which has already been printed out is deleted from the memory (S17).

As explained above, even if the remaining memory decreases to the predetermined value or less at night, the content stored in the memory is deleted, so that the reception impossible state due to the lack of memory does not occur. Since the received document data is obviously printed before it is deleted, it can be seen after that.

If the remaining memory is the predetermined amount or less and the printer 70 is busy, when the mode to instruct the interruption of the printing has been set (S13), the received document stored in the memory is printed (S16) in a manner similar to the above. The received documents which have already been printed out are deleted from the memory units 50 and 51 (S17).

If the mode to instruct the interruption of the printer is not set (S13), a message to forcedly print the received document is displayed on the CRT 60 (S13a). The system is set into a standby mode for a predetermined period of time (S14). If the time when the printer 70 can be used has come (S15), the received document stored in the memory is printed and deleted (S16 and S17).

The operator can also previously designate the instruction to interrupt the printing by the printer 70 or to wait until the document to be printed in the printer 70 is completely printed out.

Although the foregoing embodiment relates to the mixed terminal apparatus, the invention can also be applied to terminal apparatuses other than the mixed terminal.

According to the embodiment, there is an effect such that it is possible to avoid the reception impossible state which is caused due to the lack of sufficient memory to store the received document.

Figure 5:
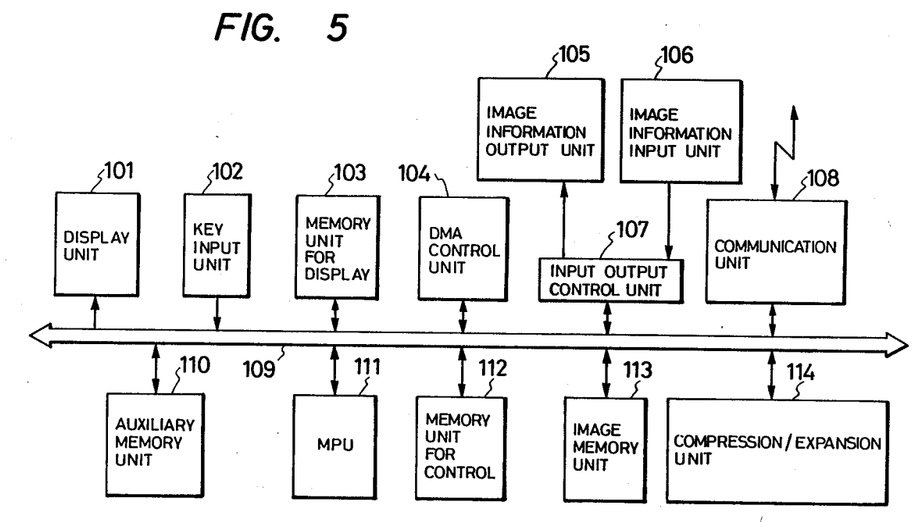
FIG. 5 is a block diagram showing a second embodiment of the invention.

FIG. 5 is a block diagram showing the second embodiment of the invention.

The second embodiment comprises: a display unit 101 to store the content of the memory unit for display; a key input unit 102 which is used to input character information and to edit the document; a memory unit 103 to store information which is displayed by the display unit 101; a DMA control unit 104 to control the DMA transfer between each memory unit and the input/output units; an image information input unit 106 and an image information output unit 105 to input and output image information; an input/output control unit 107 to control the image information input and output units 106 and 105; a communication unit 108; a main bus 109; an auxiliary memory unit 110 to store a large amount of document information; a control unit (MPU) 111 to control the whole system; a memory unit 112 to store operation control procedures, control information, and the like of the MPU 111; an image memory unit 113 to edit the document or to input and output the image information; and a compression/expansion unit 114 to compress or expand the image information.

The MPU 111 and memory unit 112 are provided as an example of the means in which when a mixed document of a plurality of pages is received, the communication is interrupted since there is a vacancy in the auxiliary memory unit. When the vacancy of the memory in the auxiliary memory unit is assured, the reception side informs the transmission side which interrupted the communication of the cancellation of the cause of the interruption of the communication and at the same time, the restart of the communication is requested.

As a rule, this embodiment temporarily stores the received document the image memory unit 103 and can be constituted so as to process the image data in the image memory unit 103.

The operations to make and edit a document in the foregoing embodiment will now be described.

First, the image information is input from the image information input unit 106 such as a reader to read an original or the like through the input/output control unit 107. The input image information is stored in the image memory unit 113 by the DMA control unit 104. The image information is then reduced ¼ by the DMA control unit 104 and transferred to the memory unit 103 which is constituted by a VRAM. Then, the reduced image information is displayed by the display unit 101 consisting of a CRT, liquid crystal display device, or the like.

The operator observes the display unit 101 and performs edits through the key input unit 102. The MPU 111 executes this instruction and edits the image information.

On the other hand, the operator operates the key input unit 102, thereby inputting the character information by codes. The MPU 111 decodes the coded character information and develops the font pattern corresponding to the character in the memory unit 103. The MPU 111 stores the input or edited character train as the codes in the memory unit 112.

After a document of one page is made in this manner, the image information is compressed by the compression/expansion unit 114 and the character information is stored as a code train in the auxilialy memory unit 110.

The operation of this embodiment will now be described.

Upon transmission, the transmission side transfers the document stored in the auxiliary memory unit 110 to the communication unit 108 through the DMA control unit 104 and transmits the document. On the other hand, upon reception, the reception of the data is communicated from the communication unit 108 to the MPU 111. The MPU 111 transfers the data from the communication unit 108 to the auxiliary memory unit 110 by use of the DMA control unit 104. At this time, the MPU 111 checks the capacity in the auxiliary memory unit 110. When there is vacancy of the memory, the MPU 111 sends a negative response to the transmission side, thereby communicating that the data reception cannot be continued. Thus, the communication is interrupted.

After that, the MPU 111 on the reception side monitors the memory capacity of the auxiliary memory unit 110. When enough capacity is assured, the MPU 111 communicates that the reception can be continued to the transmission side.

Figure 6:
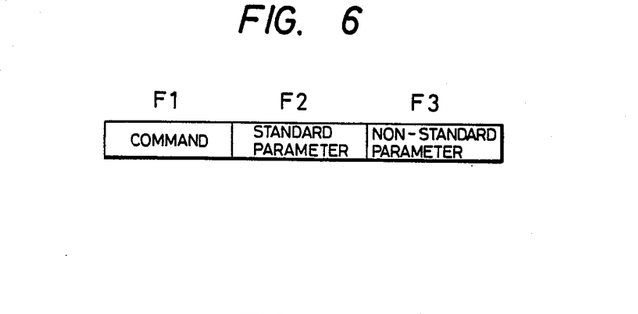
FIG. 6 is a diagram showing a format of a reception continuing command in the second embodiment.

FIG. 6 is a diagram showing a format of a command to communicate that the reception can be continued in the above embodiment.

In this diagram, a command field F1 corresponds to CSS (command session start) if the communication control protocol is based on the CCITT recommendation T.62. In addition to the command field F1, a standard parameter field F2 of the command and a non-standard parameter (NSP) F3 are also set. The non-standard parameter F3 indicates a command to enable the reception to be continued in the field.

Figure 7:
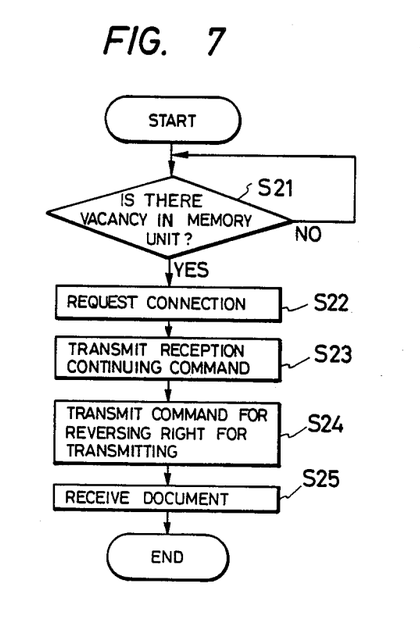
FIG. 7 is a flowchart showing the operation in a terminal on the reception side at the time of interruption after there was no vacancy of the memory in an auxiliary memory unit in the second embodiment.

FIG. 7 is a flowchart showing a communication procedure on the reception side after a proper amount of memory is assured in the auxiliary memory unit 110 after the communication had been interrupted in the foregoing embodiment.

The MPU 111 always monitors the memory capacity in the auxiliary memory unit 110 (S21). When there is a vacancy in the auxiliary memory unit 110 by the operation of the operator or by a local process, the MPU 111 generates an original call to inform the transmission side of the fact that the gate reception can be continued and requests a reconnection (S22).

After completion of a normal connection, a reception continuing command is sent to the communication unit 108 so as to transmit it in accordance with the command format shown in FIG. 6 and this command is sent to the terminal on the transmission side (S23).

Next, a command to reverse the right of transmission is sent from the terminal on the reception side upon interruption which has at present the right for transmission, to the terminal on the transmission side upon interruption through the communication unit 108, thereby reversing the right for transmission (S24).

Further, the operating mode is set to the ordinary mode to receive the document, and the document which has already been interrupted is received through the communication unit 108 and transferred to the auxiliary memory unit 110 (S25).

In the second embodiment, the non-standard parameter of the CSS command based on the CCITT recommendation T.62 has been used as the command to enable the reception to be continued. However, operations similar to those mentioned above can be also executed even in the case of using a unique mode protocol which is not based on the CCITT recommendation. If a non-standard parameter of the CSS cannot be used, the reversal of the right for transmission is merely repeated and the communication is finished.

According to the second embodiment, there is an effect such that after the communication was forcedly interrupted due to the absence of available memory in the auxiliary memory unit on the reception side, the communication can be promptly restarted when the communication with the reception side is enabled to be restarted.

On the other hand, the MPU 111 and memory unit 112 can designate on the transmission side whether the received document can be output to a recording paper on the reception side or can be stored in the memory unit or auxiliary memory unit on the reception side.

Figure 8:
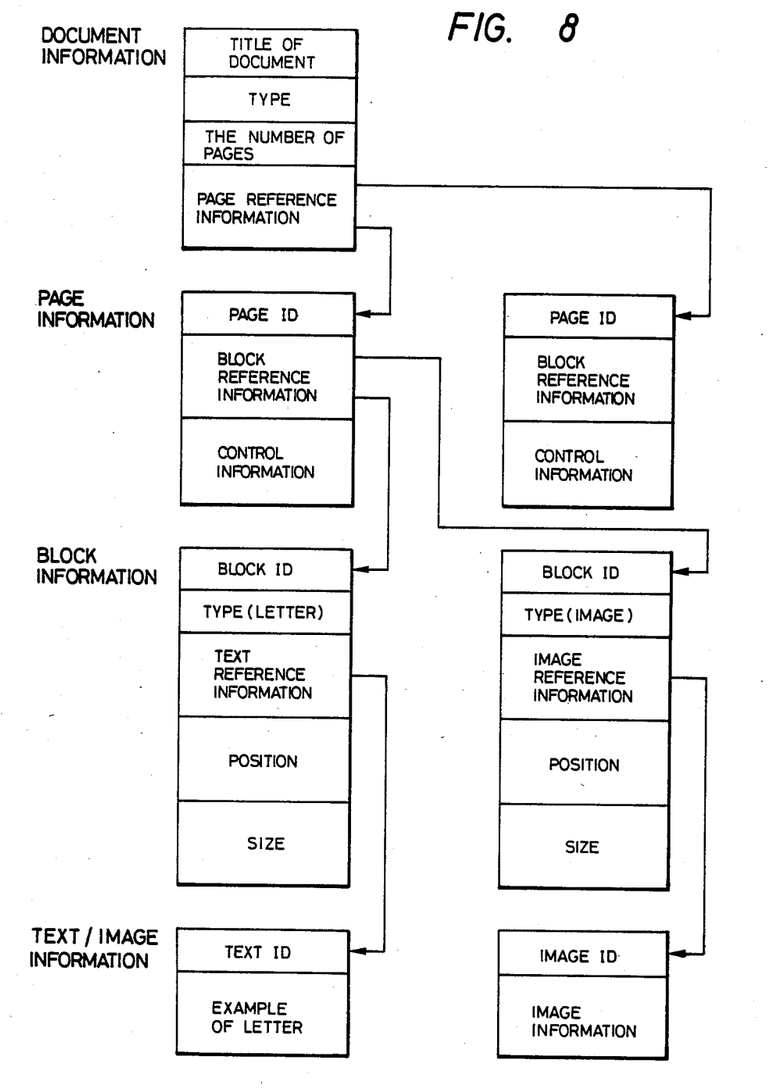
FIG. 8 is a diagram showing a structure of a document in the second embodiment.

FIG. 8 is a diagram showing the structure of document and control information.

The document has a tree-shaped structure. The document information has page reference information for each page. The page information has block reference information for the block to which the page belongs. The block information has information to refer to text-/image information. The actual character train and image information are included in the text/image information.

On the other hand, the control information is provided in the page information. The mode to receive the output is set in the control information. However, when a document is made, the output receiving mode is not set. When transmission is commanded, the operator sets the reception output mode.

Figure 9:
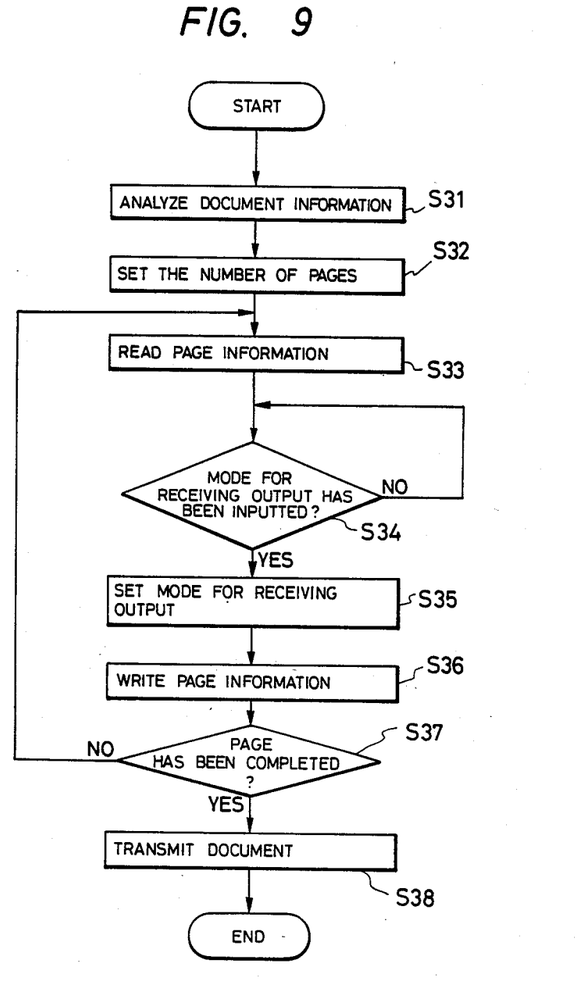
FIG. 9 is a flowchart showing processes to instruct the transmission in the second embodiment.

FIG. 9 is a flowchart showing the operation to instruct the transmission in the foregoing embodiment.

First, the document information of the designated document is read out of the auxiliary memory unit 110 and analyzed (S31). The page number is set (S32). The page information is read out of the auxiliary memory unit 110 (S33). The system waits until the operator designates the output receiving mode (S34). If the output receiving mode has been input, it is set into the control information in the page information (S35). This page information is written into the auxiliary memory unit 110 (S36). The setting of the output receiving mode denotes that a selection is made on the reception side with respect to whether the received document is memorized (stored) in the memory or is printed out (automatically emitted) by the printer without storing in the memory.

A check is then made to see if the page has been finished or not (S37). If NO, the processing routine is returned to step S33. On the other hand, if all of the pages are finished, the transmitting document in the auxiliary memory unit 110 is transferred to the communication unit 108 and transmitted by the DMA control unit 104 (S38).

Figure 10:
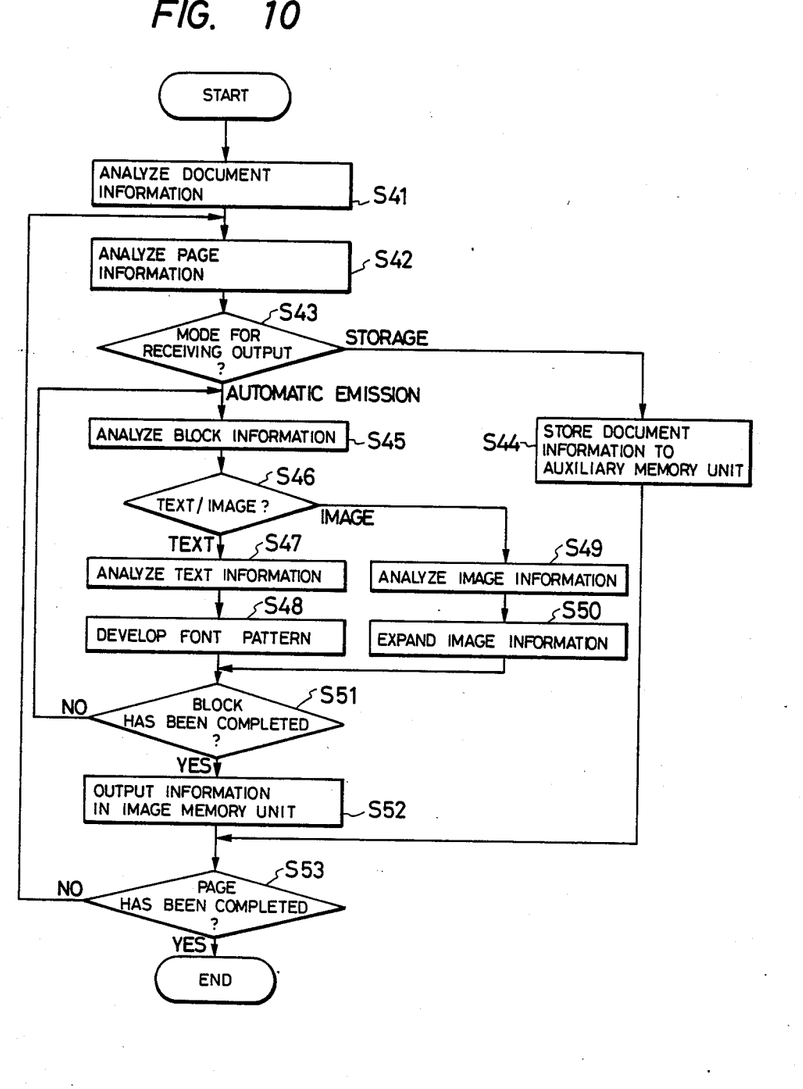
FIG. 10 is a flowchart showing processes to output a received document in the second embodiment.

FIG. 10 is a flowchart showing the processes on the reception side in the embodiment.

First, in response to a request for reception from the communication unit 108, the MPU 111 receives the document. The document information is first transferred form the communication unit 108 to the memory unit 112 by use of the DMA control unit 104 and analyzed (S41). Similar to the document information, the page information is transferred from the communication unit 108 and analyzed (S42). Next, the output receiving mode sent from the transmission side (designated by the transmission side) is checked (S43). In the case of storing the document information, the document information of one page is stored in the auxiliary memory unit 110 through the communication unit 108 by use of the DMA control unit 104 (S44). The next page is also processed in a manner similar to the above (S53).

If the output receiving mode sent from the transmission side is the mode for automatic emission in step S43, the block information is transferred from the communication unit 108 to the memory unit 112 and analyzed (S45). A check is made to see if the analyzed block corresponds to the text information or image information (S46). If it is the text information, this text information is analyzed (S47) and converted from the character code to the font pattern (S48) and stored in the image memory unit 113 on the basis of the position and size indicated by the block information. On the other hand, in the case of the image information (S46), this image information is analyzed (S49) and expanded on the basis of the position and size indicated by the block information through the compression/expansion unit 114 and stored in the image memory unit 113 (S50).

If the operations regarding all of the blocks have been finished (S51), the information of one page which was stored in the image memory unit 113 and developed as a bit image is transferred to the image information output unit 105 and printed out by use of the DMA control unit 104 by instructing the input/output control unit 107 (S52). If the operations regarding all of the pages have been completed (S53), the process to receive the document is finished.

Therefore, in the foregoing embodiment, for the document to be immediately sent from the transmission side, by commanding the automatic emission to the reception side, this document is automatically transmitted, so that it is possible to eliminate such an inconvenience that the document is stored and held on the reception side. In this case, since the document is printed out simultaneously with the reception, even if the hardware is out of order while the document is being stored into the memory on the reception side, trouble due to the deletion of the document is not caused. On the other hand, if there is no remaining memory in the memory unit on the reception side, by commanding the automatic emission, the reception is not refused.

In the foregoing embodiment, the document output mode has been set into the control information in the page information and transmitted. However, the output receiving mode can be also transmitted together with the document information by including it therein. On the other hand, a part of the page ID in the page information may be also set to a sub ID and discriminated by the page ID.

For a confidential document which must not be read by general persons, the transmission side can, actively instruct the apparatus so that the document is in the memory on the reception side without being printed out on the reception side. In this case, this document can be printed out only when the operator on the reception side requests it.

According to the embodiment, there is an effect such that the document sent from the transmission side can be certainly and promptly output on the reception side.

The present invention is not limited to the foregoing embodiments but many modifications and variations are possible within the spirit and scope of the appended claims of the invention.

What is claimed is:

1. A communication system comprising:
   receiving means for receiving data;
   memory means for storing the received data;
   designating means for designating the data stored in said memory means;
   instructing means for commanding a printing of the data designated by said designating means;
   display means for displaying the data stored in said memory means;
   recording means for recording the designated data on the basis of the command by said instructing means; and
   control means for causing said recording means to automatically record the received data when an abnormality of the memory means exists, even without a command by said instructing means.

2. A system according to claim 1, wherein said abnormality is a failure of said memory means.

3. A system according to claim 1, wherein said abnormality denotes that a memory capacity in said memory means is a predetermined amount or less.

4. A system according to claim 1, further comprising deleting means for commanding the deletion from said memory means of the data designated by said designating means.

5. A system according to claim 1, wherein said data comprises mixed data including of image information and character code information.

6. A communication system comprising:
receiving means for receiving data;
memory means for storing received data;
designating means for designating the data stored in said memory means;
instructing means for commanding the printing of the data designated by said designating means;
recording means for recording the designated data on the basis of the command by said instructing means; and
control means for causing the data in the memory means to be recorded by said recording means when a memory capacity in said memory means is a predetermined amount or less even when the printing command is not issued by said instructing means.

7. A system according to claim 6, wherein when said memory capacity in said memory means is the predetermined amount or less, if said recording means is recording other data, said control means causes the data in the memory means to be recorded by the recording means after completion of the recording of said other data.

8. A system according to claim 6, further comprising display means for displaying an end of a recording operation if said recording means is recording other data when the memory capacity in said memory means is the predetermined amount or less.

9. A system according to claim 6, wherein said data comprises mixed data including of image information and character code information.

10. A data communication apparatus comprising:
receiving means for receiving mixed data comprising image data and character code data on at least a single page;
memory means for storing said mixed data therein;
converting means for converting the mixed data to image data;
recording means for recording the image data converted by said converting means; and
control means for causing said mixed data to be output to a selected one of said recording means and said memory means in accordance with a designation signal received from a transmission device.

* * * * *

UNITED STATES PATENT AND TRADEMARK OFFICE
CERTIFICATE OF CORRECTION

PATENT NO. : 4,907,094
DATED : March 6, 1990
INVENTOR(S) : KENICHI MISHIMA ET AL.

It is certified that error appears in the above-identified patent and that said Letters Patent is hereby corrected as shown below:

AT [57] ABSTRACT

Line 5, "unit" should read --unit to--.

COLUMN 2

Line 62, "4,679,903," should read --4,679,093,--.

COLUMN 11

Line 11, "of" should be deleted.

COLUMN 12

Line 13, "of" should be deleted.

Signed and Sealed this

Thirty-first Day of March, 1992

Attest:

HARRY F. MANBECK, JR.

Attesting Officer

Commissioner of Patents and Trademarks